United States Patent
Izumi et al.

(10) Patent No.: US 8,185,074 B2
(45) Date of Patent: May 22, 2012

(54) RECEIVING APPARATUS, RECEIVING METHOD AND WIRELESS COMMUNICATION SYSTEM

(75) Inventors: Seiichi Izumi, Kanagawa (JP); Hiroaki Takano, Saitama (JP); Ryou Sawai, Tokyo (JP); Tomoya Yamaura, Tokyo (JP); Masanori Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/473,404

(22) Filed: May 28, 2009

(65) Prior Publication Data

US 2009/0305629 A1    Dec. 10, 2009

(30) Foreign Application Priority Data

Jun. 9, 2008   (JP) ................................ P2008-150914

(51) Int. Cl.
    *H04B 1/06*   (2006.01)
    *H04B 7/00*   (2006.01)
(52) U.S. Cl. .................................... 455/273; 455/279.1
(58) Field of Classification Search ........ 455/272–279.1
    See application file for complete search history.

(56) References Cited

U.S. PATENT DOCUMENTS

2009/0175367 A1 *   7/2009   Kishigami et al. ............ 375/260

FOREIGN PATENT DOCUMENTS

| JP | 4-207821     | 7/1992  |
|----|--------------|---------|
| JP | 7-154129     | 6/1995  |
| JP | 11-239086    | 8/1999  |
| JP | 2002-368712  | 12/2002 |
| JP | 2003-318855  | 11/2003 |
| JP | 2006-25047   | 1/2006  |
| JP | 2006-238548  | 9/2006  |
| JP | 2006-295629  | 10/2006 |
| JP | 2007-221500  | 8/2007  |

* cited by examiner

*Primary Examiner* — Christian Hannon
(74) *Attorney, Agent, or Firm* — Finnegan, Henderson, Farabow, Garrett & Dunner, L.L.P.

(57) ABSTRACT

There is provided a receiving apparatus including a plurality of antennas, a phase difference detection unit to detect a phase difference of each of a plurality of received signals received by the plurality of antennas, a phase adjustment unit to align phase of the plurality of received signals based on the phase difference detected by the phase difference detection unit, an adding unit to add the plurality of received signals with the phase aligned by the phase adjustment unit together, and a synchronous detection unit to perform synchronous detection using a signal obtained by addition in the adding unit.

5 Claims, 9 Drawing Sheets

RECEIVING APPARATUS, RECEIVING METHOD AND WIRELESS COMMUNICATION SYSTEM

BACKGROUND OF THE INVENTION

1. Field of the Invention

The present invention relates to a receiving apparatus, a receiving method and a wireless communication system.

2. Description of the Related Art

There is a recent tend to mount a plurality of transmitting-receiving antennas on a wireless communication apparatus in order to enable MIMO (Multiple-Input Multiple-Output) communications. Further, the wireless communication apparatus with a plurality of transmitting-receiving antennas includes a plurality of cross-correlation detectors for synchronous detection in order to detect synchronism with each of a plurality of received signals. The wireless communication apparatus cuts out a frame from the received signal based on the synchronous timing detected by the cross-correlation detectors and performs FFT processing on each cut-out frame. A plurality of cross-correlation detectors for synchronous detection are disclosed in Japanese Unexamined Patent Publication No. 2006-238548, for example.

SUMMARY OF THE INVENTION

However, there is a concern that mounting the same number of cross-correlation detectors as the transmitting-receiving antennas on the wireless communication apparatus causes an increase in circuit scale and power consumption of the wireless communication apparatus. On the other hand, there is a concern that reducing the number of cross-correlation detectors mounted on the wireless communication apparatus for the purpose of reducing the circuit scale and the power consumption causes degradation of the accuracy of detecting cross-correlation.

In light of the above concerns, it is desirable to provide a novel and improved receiving apparatus, receiving method and wireless communication system that are capable of suppressing degradation of the detection accuracy of cross-correlation and reducing the circuit scale for cross-correlation detection.

According to an embodiment of the present invention, there is provided a receiving apparatus including a plurality of antennas, a phase difference detection unit to detect a phase difference of each of a plurality of received signals received by the plurality of antennas, a phase adjustment unit to align phase of the plurality of received signals based on the phase difference detected by the phase difference detection unit, an adding unit to add the plurality of received signals with the phase aligned by the phase adjustment unit together, and a synchronous detection unit to perform synchronous detection using a signal obtained by addition in the adding unit.

The phase difference detection unit may detect the phase difference by a first repetitive signal added to each of the plurality of received signals, and the phase adjustment unit may align the phase of a second repetitive signal added after the first repetitive signal.

The receiving apparatus may include a storage unit to store the second repetitive signal contained in each of the plurality of received signals received by the plurality of antennas, a channel estimation unit to estimate a channel condition affecting each of the plurality of received signals based on a synchronous detection result by the synchronous detection unit, and a correction unit to correct the second repetitive signal stored in the storage unit based on an estimation result of the channel condition by the channel estimation unit, and the synchronous detection unit may perform synchronous detection again using the second repetitive signal corrected by the correction unit.

The receiving apparatus may further include a frequency error estimation unit to estimate a frequency error of the plurality of received signals using a signal obtained by addition in the adding unit.

According to another embodiment of the present invention, there is provided a receiving method including the steps of receiving a radio signal transmitted from periphery as a received signal by each of a plurality of antennas, detecting a phase difference of each of a plurality of received signals received by the plurality of antennas, aligning phase of the plurality of received signals based on the phase difference, adding the plurality of received signals with the phase aligned together, and performing synchronous detection using a signal obtained by the addition.

According to another embodiment of the present invention, there is provided a wireless communication system which includes a receiving apparatus including a plurality of antennas, a phase difference detection unit to detect a phase difference of each of a plurality of received signals received by the plurality of antennas, a phase adjustment unit to align phase of the plurality of received signals based on the phase difference detected by the phase difference detection unit, an adding unit to add the plurality of received signals with the phase aligned by the phase adjustment unit together, and a synchronous detection unit to perform synchronous detection using a signal obtained by addition in the adding unit; and a transmitting apparatus being a transmission source of the plurality of received signals to be received by the plurality of antennas.

According to the embodiments of the present invention described above, it is possible to suppress degradation of the detection accuracy of cross-correlation and reduce the circuit scale for cross-correlation detection.

DETAILED DESCRIPTION OF THE PREFERRED EMBODIMENTS

Figure 1:
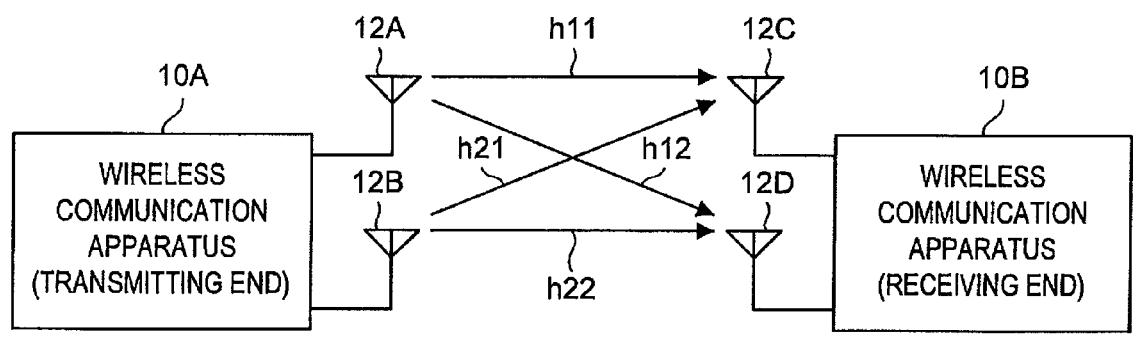
FIG. 1 is an explanatory view showing the overall structure of a wireless communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described in the following order:
(1) Outline of the embodiment
(1-1) Overall structure of the wireless communication system
(1-2) Structure of the transmitting apparatus
(1-3) Structure of the preamble
(1-4) Structure of the receiving apparatus
(2) Circumstances of development of the embodiment
(3) First embodiment of the present invention
(3-1) Structure of the synchronous circuit unit according to the first embodiment of the present invention
(3-2) Operation of the first embodiment of the present invention
(4) Second embodiment of the present invention
(5) Third embodiment of the present invention
(6) Summary (1) Outline of the Embodiment (1-1) Overall Structure of the Wireless Communication System The overall structure of a wireless communication system 1 according to an embodiment is described hereinafter with reference to FIG. 1.

FIG. 1 is an explanatory view showing the overall structure of the wireless communication system 1 according to the embodiment. As shown in FIG. 1, the wireless communication system 1 includes a plurality of wireless communication apparatus 10A and 10B. The wireless communication apparatus 10A and 10B may serve as any of the transmitting end and the receiving end, and FIG. 1 shows an example where the wireless communication apparatus 10A serves as the transmitting end and the wireless communication apparatus 10B (receiving apparatus) serves as the receiving end. In this description, each of a plurality of elements having the same function is distinguished by affixing a different alphabetical letter to the same reference numeral. However, when there is no particular need to distinguish between a plurality of elements having the same function, they are denoted by the same reference numeral. For example, when there is no particular need to distinguish between the wireless communication apparatus 10A and 10B, they are collectively referred to simply as the wireless communication apparatus 10.

As shown in FIG. 1, the wireless communication apparatus 10A includes a plurality of antennas 12A and 12B, and the wireless communication apparatus 10B includes a plurality of antennas 12C and 12D. The wireless communication apparatus 10A and 10B can implement diversity reception and MIMO communication based on IEEE 802.11n standard with use of the plurality of antennas 12A to 12D.

The diversity reception is a receiving method in which the wireless communication apparatus 10B receives radio signals transmitted from the periphery by the plurality of antennas 12C and 12D and uses the radio signals received by both antennas in a composite manner, thereby improving the reliability of communication even when the S/N ratio of the radio signals is low. The MIMO communication is a communication method in which the wireless communication apparatus 10A transmits signals from the antennas 12A and 12B, and the wireless communication apparatus 10B receives the signals by the antennas 12C and 12D and decrypts them. The MIMO communication is specifically described hereinafter.

It is assumed that a signal transmitted from the antenna 12A of the wireless communication apparatus 10A is x1, a signal transmitted from the antenna 12B of the wireless communication apparatus 10A is x2, a signal received by the antenna 12C of the wireless communication apparatus 10B is y1, and a signal received by the antenna 12D of the wireless communication apparatus 10B is y2. It is also assumed that the characteristics of a transmission line between the antenna 12A and the antenna 12C are h1, the characteristics of a transmission line between the antenna 12A and the antenna 12D are h12, the characteristics of a transmission line between the antenna 12B and the antenna 12C are h21 and the characteristics of a transmission line between the antenna 12B and the antenna 12D are h22. In this case, the relationship between a signal transmitted from the wireless communication apparatus 10A and a signal received by the wireless communication apparatus 10B can be represented as the following expression 1:

$$\begin{pmatrix} y1 \\ y2 \end{pmatrix} = \begin{pmatrix} h11 & h21 \\ h12 & h22 \end{pmatrix} \begin{pmatrix} x1 \\ x2 \end{pmatrix} \qquad \text{(Expression 1)}$$

The first term on the right-hand side of the expression 1 is sometimes called a channel matrix H (transfer function). The channel matrix H can be obtained in the wireless communication apparatus 10A by transmitting a known signal from the wireless communication apparatus 10B before transmission of x1 and x2.

The wireless communication apparatus 10B can estimate the signal transmitted from the antenna 12A to be x1 and the signal transmitted from the antenna 12B to be x2 by using the inverse matrix of the channel matrix H. In this manner, the MIMO communication is effective in being able to increase a transmission rate in proportion to the number of antennas without enlarging the frequency band to use. Although FIG. 1 shows an example where the wireless communication apparatus 10A and 10B each include two antennas, the wireless communication apparatus 10A and 10B may include three or more antennas.

Further, the diagonal elements of the channel matrix H become noise upon signal separation (cross talk) and cause a decrease in stream SNR. In order to suppress the cross talk, beam forming (Eigenmode-SDM (Space Division Multiplexing)) is proposed, and such beam forming may be applied to the present invention.

Further, the wireless communication apparatus 10 may be an information processing apparatus such as a PC (Personal Computer), a home video processing device (e.g. a DVD recorder, a videocassette recorder etc.), a cellular phone, a PHS (Personal Handyphone System), a portable sound playback device, a portable video processing device, a PDA (Personal Digital Assistants), a home game device, a portable game device or an electrical household appliance.

(1-2) Structure of the Transmitting Apparatus

Figure 2:
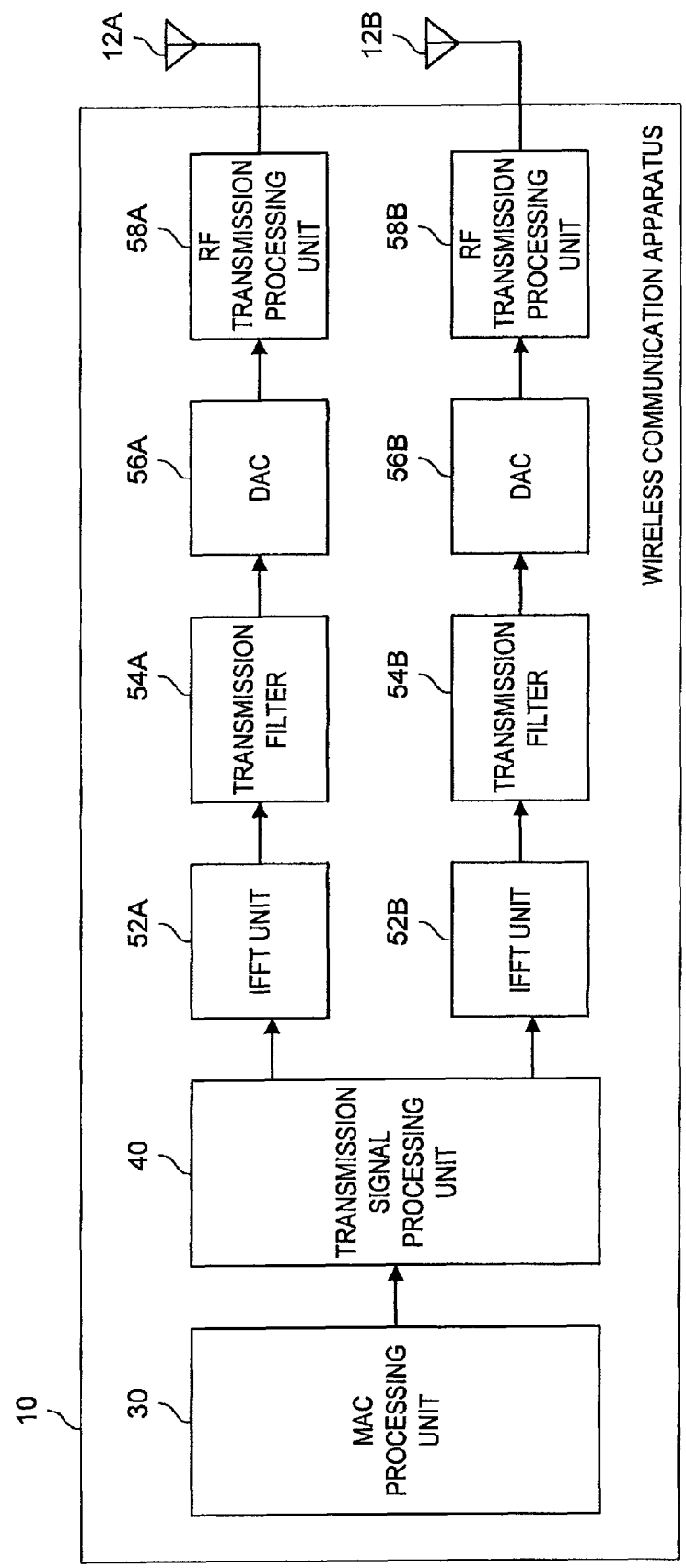
FIG. 2 is a functional block diagram showing the structure for the wireless communication apparatus to function as a transmitting apparatus.

Referring next to FIG. 2, the structure for the wireless communication apparatus 10 to function as a transmitting apparatus is described hereinafter.

FIG. 2 is a functional block diagram showing the structure for the wireless communication apparatus 10 to function as a transmitting apparatus. As shown in FIG. 2, the wireless communication apparatus 10 includes the antennas 12A and 12B, a MAC processing unit 30, a transmission signal processing unit 40, IFFT units 52A and 52B, transmission filters 54A and 54B, DACs 56A and 56B, and RF transmission processing units 58A and 58B.

The MAC (Medium Access Control) processing unit 30 performs access control in wireless communication. For example, the MAC processing unit 30 adds control information such as a MAC address of the own apparatus and a MAC address of a destination apparatus to transmission data and outputs it as a bit string.

The transmission signal processing unit 40 performs signal processing such as MIMO transmission processing and modulation processing on the bit string output form the MAC processing unit 30. The MIMO transmission processing is allocation of the bit string to each branch, beam forming or the like, for example. Further, the transmission signal processing unit 40 may perform modulation by any of the modulation schemes such as BPSK (Binary Phase Shift Keying), QPSK, 16QAM (Quadrature Amplitude Modulation), 64QAM, 256QAM and 8 PSK according to the condition of the transmission line. The transmission signal processing unit 40 may perform modulation on each bit allocated to each subcarrier in order to implement OFDM (Orthogonal Frequency Division Multiplexing).

The IFFT (Inverse Fast Fourier Transform) unit 52 converts a signal in the frequency domain obtained by the signal processing in the transmission signal processing unit 40 into a transmission signal in the time domain (OFDM signal) by inverse fast Fourier transform. The transmission filter 54 extracts a prescribed frequency component from the transmission signal in the time domain obtained in the IFFT unit 52. A guard interval may be added to the transmission signal in the time domain.

The DAC (Digital-to-Analog Conversion unit) 56 converts the transmission signal having the frequency component extracted by the transmission filter 54 from digital to analog. Then, the RF transmission processing unit 58 converts the analog transmission signal into a high-frequency signal (e.g. 5 GHz band) by IQ modulation, for example. After that, the antenna 12 transmits the high-frequency signal output from the connected RF transmission processing unit 58 as a radio signal.

The wireless communication apparatus 10 transmits a preamble having a known signal pattern at the head of the radio signal. The structure of the preamble is briefly described hereinafter with reference to FIG. 3.

(1-3) Structure of the Preamble

Figure 3:
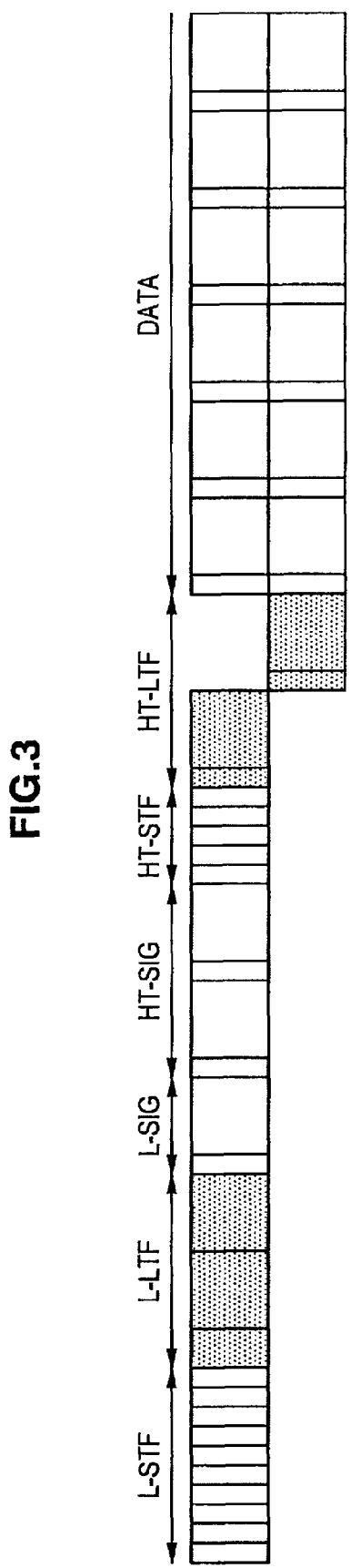
FIG. 3 is an explanatory view showing the structure of a part of a preamble.

FIG. 3 is an explanatory view showing the structure of a part of the preamble. As shown in FIG. 3, the preamble contains L-STF (Short Training Field), L-LTF (Long Training Field), L-SIG, HT-SIG, HT-STF and HT-LTF, and data (DATA) is added after that.

In the L-STF (first repetitive signal), a signal pattern with a period of 0.8 µs is repeated ten times, and the wireless communication apparatus 10 detects reception of a radio signal based on the L-STF. In the L-LTF (second repetitive signal), after the latter half (1.6 µs) of a signal pattern with a period of 3.2 µs, the signal pattern is repeated twice. Thus, the latter half of the signal pattern added at the head of the L-LTF serves as a guard interval.

The L-SIG and the HT-SIG contain information such as a transmission rate and a modulation scheme of the data contained in the frame. The HT-LTF is used to estimate a channel for each branch in the wireless communication apparatus 10.

The preamble is prestored as a signal in the time domain in the wireless communication apparatus 10, and the wireless communication apparatus 10 may add the stored preamble to the head of the transmission signal in the time domain which is output from the IFFT unit 52.

(1-4) Structure of the Receiving Apparatus

Figure 4:
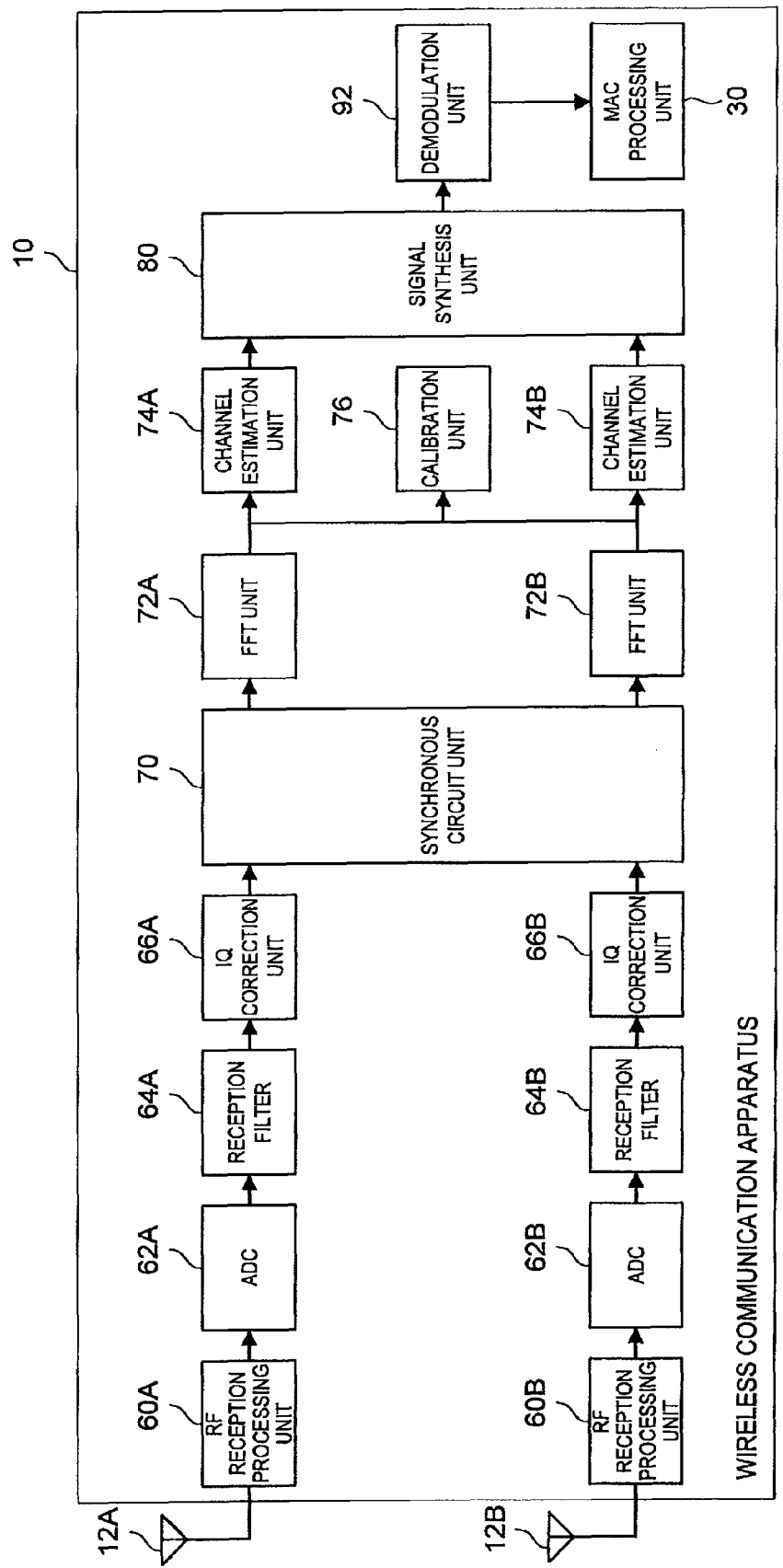
FIG. 4 is a functional block diagram showing the structure for the wireless communication apparatus to function as a receiving apparatus.

Referring to FIG. 4, the structure for the wireless communication apparatus 10 to function as a receiving apparatus is described hereinafter.

FIG. 4 is a functional block diagram showing the structure for the wireless communication apparatus 10 to function as a receiving apparatus. As shown in FIG. 4, the wireless communication apparatus 10 includes the antennas 12A and 12B, RF reception processing units 60A and 60B, ADCs 62A and 62B, reception filters 64A and 64B, IQ correction units 66A and 66B, a synchronous circuit unit 70, FFT units 72A and 72B, channel estimation units 74A and 74B, a calibration unit 76, a signal synthesis unit 80, a demodulation unit 92, and a MAC processing unit 30.

The antenna 12 receives a radio signal transmitted from the periphery and outputs it as a high-frequency signal to the connected RF reception processing unit 60. The RF reception processing unit 60 down-converts the high-frequency signal input from the antenna 12 and generates an analog baseband received signal (received signal).

The ADC (Analog-to-Digital Conversion unit) 62 converts the analog baseband received signal generated by the RF reception processing unit 60 into a digital baseband received signal and outputs it. The reception filter 64 extracts a prescribed frequency component contained in the digital baseband received signal output from the ADC 62. The IQ correction unit 66 corrects the imbalance between the I-channel and the Q-channel constituting the baseband received signal.

The synchronous circuit unit 70 includes an auto-correlation circuit for detecting the STF and a cross-correlation detector for detecting the LTF, which are described above with reference to FIG. 3, and it detects the synchronous timing for cutting out a packet frame subsequent to the preamble. The structure of the synchronous circuit unit 70 is described in detail later in and after "(3) First embodiment of the present invention".

The FFT unit 72 cuts out a packet frame based on the synchronous timing detected by the synchronous circuit unit 70, performs FFT processing on each cut-out packet frame and generates a received signal in the frequency domain. Then, the channel estimation unit 74 estimates the transfer function of the transmission line of the radio signal. In other words, the channel estimation unit 74 estimates the channel matrix H shown in the expression 1.

The signal synthesis unit 80 performs MIMO reception processing based on the channel matrix H estimated by the channel estimation unit 74. For example, the signal synthesis unit 80 may multiply the signal output from the channel estimation unit 74 by the inverse matrix of the channel matrix H estimated by the channel estimation unit 74.

The demodulation unit 92 demodulates the signal obtained by the signal synthesis unit 80 and outputs a result as a bit string. The MAC processing unit 30 receives the bit string from the demodulation unit 92 and then analyzes the control information contained in the bit string and supplies information different form the control information contained in the bit string to the upper layer.

(2) Circumstances of Development of the Embodiment

The embodiment is schematically described in the foregoing with reference to FIGS. 1 to 4. Hereinafter, the circumstances of development of the embodiment is described, taking the structure of a synchronous circuit unit 200 of a wireless communication apparatus related to the embodiment as a comparative example.

Figure 5:
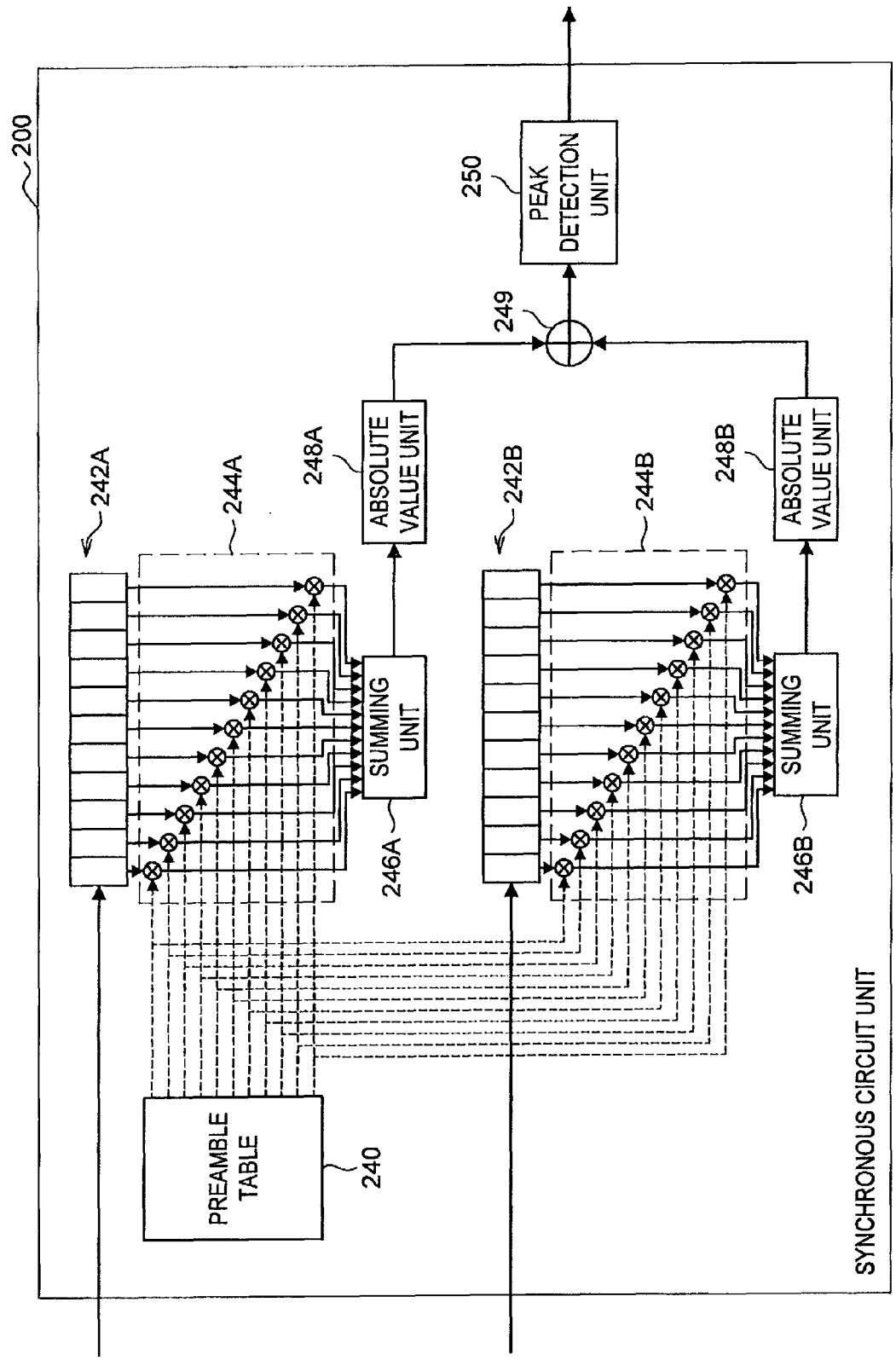
FIG. 5 is a functional block diagram showing the structure of a synchronous circuit unit of a wireless communication apparatus related to the embodiment.

FIG. 5 is a functional block diagram showing the structure of the synchronous circuit unit 200 of the wireless communication apparatus related to the embodiment. As shown in FIG. 5, the synchronous circuit unit 200 of the wireless communication apparatus related to the embodiment includes a preamble table 240, shift registers 242A and 242B, filter units 244A and 244B, summing units 246A and 246B, absolute value units 248A and 248B, an adding unit 249 and a peak detection unit 250. Although the synchronous circuit unit 200 further has a structure for detecting auto-correlation, illustration of the structure for detecting auto-correlation is omitted in FIG. 5.

The preamble table 240 stores signal patterns of the L-LTF. Each of the shift registers 242A and 242B receives the L-LTF of the corresponding baseband received signal, delays the input L-LTF by one sample each and transfers it to the register in the subsequent stage.

Each of the filter units 244A and 244B multiplies the sample stored in each register of the shift register 242A or 242B by a factor corresponding to the signal pattern of the L-LTF stored in the preamble table 240. Each of the summing units 246A and 246B sums the values obtained by the multiplication in the shift register 242A or 242B.

Each of the absolute value units 248A and 248B converts the sum value obtained by the summing unit 246A or 246B into an absolute value because the cross-correlation is not in-phase in the baseband received signals. Then, the adding unit 249 adds up the sum values converted into absolute values by the absolute value units 248A and 248B, and the peak detection unit 250 detects the synchronous timing from the signal added up by the adding unit 249.

As described above, the synchronous circuit unit 200 of the wireless communication apparatus related to the embodiment detects the cross-correlation between the L-LTF contained in each baseband received signal and the L-LTF prestored in the preamble table. Thus, it is necessary for the synchronous circuit unit 200 of the wireless communication apparatus related to the embodiment to include the shift register 242, the filter unit 244, the summing unit 246 and so on for each branch.

The auto-correlation for packet finding, frequency error estimation or the like is obtained by the product of the baseband received signal and the complex conjugate of its delayed signal. Because the auto-correlation is in-phase in the respective baseband received signals, it is possible to sum the respective auto-correlations and use it for the subsequent processing.

On the other hand, in the case of processing to obtain the synchronous timing from the cross-correlation between the known signal pattern and the baseband received signal or the like, it is not appropriate to merely sum the cross-correlations of the respective baseband received signals because the cross-correlation is not always in-phase in the respective baseband received signals. Accordingly, although it is appropriate to use the absolute value of the cross-correlation as shown in FIG. 5, this causes an increase in the circuit scale for detecting the cross-correlation, such as the shift register 242, the filter unit 244 and the summing unit 246.

On the other hand, if the structure for detecting the cross-correlation is merely made smaller for reducing the circuit scale, only one antenna can be connected to the structure for detecting the cross-correlation because it is difficult to share structure for detecting the cross-correlation among a plurality of branches. It is thereby assumed to degrade the timing estimation performance based on the cross-correlation.

Given such circumstances, the wireless communication apparatus 10 according to the first to third embodiments of the present invention have been invented. According to the wireless communication apparatus 10 according to the first to third embodiments of the present invention, it is possible to reduce the circuit scale for cross-correlation detection while suppressing degradation of the detection accuracy of cross-correlation. The first to third embodiments of the present invention are sequentially described hereinafter.

Figure 6:
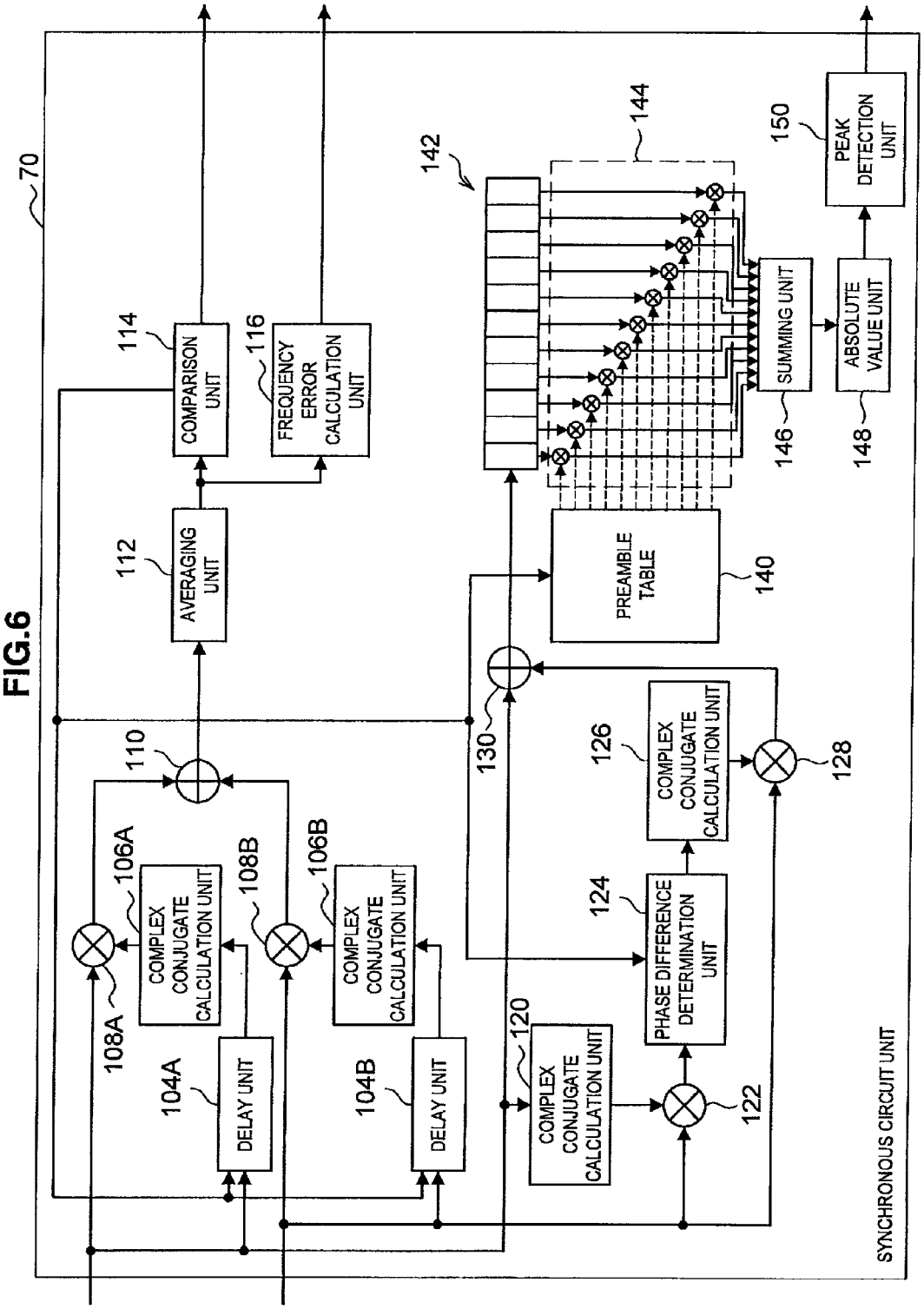
FIG. 6 is a functional block diagram showing the structure of a synchronous circuit unit according to a first embodiment of the present invention.

(3) First Embodiment of the Present Invention (3-1) Structure of the Synchronous Circuit Unit According to the First Embodiment of the Present Invention FIG. 6 is a functional block diagram showing the structure of a synchronous circuit unit 70 according to the first embodiment of the present invention. As shown in FIG. 6, the synchronous circuit unit 70 according to the first embodiment includes delay units 104A and 104B, complex conjugate calculation units 106A and 106B, multiplying units 108A and 108B, an adding unit 110, an averaging unit 112, a comparison unit 114, a frequency error calculation unit 116, a complex conjugate calculation unit 120, a multiplying unit 122, a phase difference determination unit 124, a complex conjugate calculation unit 126, a multiplying unit 128, an adding unit 130, a preamble table 140, a shift register 142, a filter unit 144, a summing unit 146, an absolute value unit 148, and a peak detection unit 150.

(Auto-Correlation Detection, Frequency Error Estimation)

The delay units 104A and 104B, the complex conjugate calculation units 106A and 106B, the multiplying units 108A and 108B, the adding unit 110, the averaging unit 112 and the comparison unit 114 function as an auto-correlation detection unit that detects auto-correlation in the L-STF contained in the preamble.

Specifically, the delay unit 104A receives input of a baseband received signal of a branch A (a baseband received signal based on a radio signal received by the antenna 12A), delays the input baseband received signal of the branch A by 0.8 µs and outputs a result. The delay time 0.8 µs of the baseband received signal by the delay unit 104A corresponds to the repetition period of the signal pattern in the L-STF. Likewise, the delay unit 104B receives input of a baseband received signal of a branch B (a baseband received signal based on a radio signal received by the antenna 12B), delays the input baseband received signal of the branch B by 0.8 µs and outputs a result.

The complex conjugate calculation unit 106A calculates the complex conjugate of the L-STF delayed by the delay unit 104A, and the complex conjugate calculation unit 106B calculates the complex conjugate of the L-STF delayed by the delay unit 104B. The multiplying unit 108A multiplies the baseband received signal of the branch A and the baseband received signal of the branch A which is delayed by 0.8 µs and on which complex conjugate calculation is performed. Likewise, the multiplying unit 108B multiplies the baseband received signal of the branch B and the baseband received signal of the branch B which is delayed by 0.8 µs and on which complex conjugate calculation is performed.

The adding unit 110 adds the multiplied value obtained by the multiplying unit 108A and the multiplied value obtained by the multiplying unit 108B together, and the averaging unit 112 calculates the average of the added value obtained by the adding unit 110. Then, the comparison unit 114 performs packet detection based on the average value obtained by the averaging unit 112. The phase shift amount between the L-STF and the L-STF delayed by 0.8 μs (the multiplied value by the multiplying units 108A and 108B) is the same between the branch A and the branch B, which is different form the case of cross-correlation, and it is thus considered that the values are not canceled out even if they are added together by the adding unit 110.

Further, the comparison unit 114 detects the packet and, if it determines that the L-STF ends, it outputs a control signal to the delay units 104A and 104B, the phase difference determination unit 124 and the preamble table 140. In response to input of the control signal from the comparison unit 114, the delay units 104A and 104B switch the delay time from 0.8 μs to 3.2 μs and thereby delay the input L-LTF by 3.2 μs and outputs a result. The delay time 3.2 μs corresponds to the repetition period of the signal pattern in the L-LTF.

Consequently, the frequency error calculation unit 116 can estimate a frequency error (frequency offset) of the received signal in the L-LTF based on the signal output from the averaging unit 112. Then, the frequency error calculation unit 116 outputs a frequency error signal indicating the estimated frequency error, so that correction based on the frequency error signal is performed. As described above, by switching the delay time in the delay units 104A and 104B for each of the L-STF and the L-LTF, it is possible to use one circuit structure for both auto-correlation detection and frequency error estimation.

(Cross-Correlation Detection)

The structure for detecting cross-correlation is described hereinafter. When receiving the L-STF, the complex conjugate calculation unit 120 calculates the complex conjugate of the L-STF contained in the baseband received signal of the branch A. Then, the multiplying unit 122 multiplies the complex conjugate of the L-STF of the branch A and the L-STF of the branch B to thereby calculate the phase difference between the L-STF of the branch A and the L-STF of the branch B.

The phase difference determination unit 124 averages the phase difference obtained by the multiplying unit 122 until the control signal indicating end of the L-STF is input from the comparison unit 114 and determines the average value upon input of the control signal as a phase difference between the baseband received signals of the branch A and the branch B. Thus, the complex conjugate calculation unit 120, the multiplying unit 122 and the phase difference determination unit 124 function as a phase difference detection unit that detects the phase difference between the baseband received signals of the branch A and the branch B.

Then, when receiving the L-LTF, the complex conjugate calculation unit 126 calculates the complex conjugate of the rotation vector indicating the phase difference determined by the phase difference determination unit 124. The multiplying unit 128 multiplies the L-LTF of the branch B by the complex conjugate of the rotation vector calculated by the complex conjugate calculation unit 126 to thereby align the phase of the L-LTF of the branch B with the phase of the L-LTF of the branch A. Thus, the complex conjugate calculation unit 126 and the multiplying unit 128 function as a phase adjustment unit in cooperation with each other.

The adding unit 130 adds the L-LTF of the branch A and the L-LTF of the branch B with the phase aligned with the L-LTF of the branch A by the complex conjugate calculation unit 126 and the multiplying unit 128. Then, the L-LTF added up by the adding unit 130 is output to the shift register 142.

The preamble table 140 stores the signal pattern of the L-LTF. The shift register 142 receives input of the L-LTF obtained by the adding unit 130, delays the input L-LTF by one sample each and transfers a result to the subsequent register.

The filter unit 144 multiplies the sample stored in each register of the shift register 142 by the factor corresponding to the signal pattern of the L-LTF stored in the preamble table 140. The summing unit 146 sums the values obtained by the multiplication in the filter unit 144.

The absolute value unit 148 converts the sum value obtained by the summing unit 146 into an absolute value. Then, the peak detection unit 150 detects the peak position of the signal value converted into the absolute value by the absolute value unit 148 as a synchronous timing. Thus, the preamble table 140, the shift register 142, the filter unit 144, the summing unit 146, the absolute value unit 148 and the peak detection unit 150 function as a cross-correlation detection unit or a synchronous detection unit.

As described above, according to the embodiment, it is possible to detect the cross-correlation and the synchronous timing by using the L-LTF of a plurality of branches in an adding manner. It is thereby possible to suppress degradation of the detection accuracy of cross-correlation while reducing the circuit scale for cross-correlation detection.

(3-2) Operation of the First Embodiment of the Present Invention

The structure of the synchronous circuit unit 70 of the wireless communication apparatus 10 according to the first embodiment of the present invention is described in the foregoing with reference to FIG. 6. Hereinafter, the operation of the wireless communication apparatus 10 according to the first embodiment of the present invention is described with reference to FIG. 7.

Figure 7:
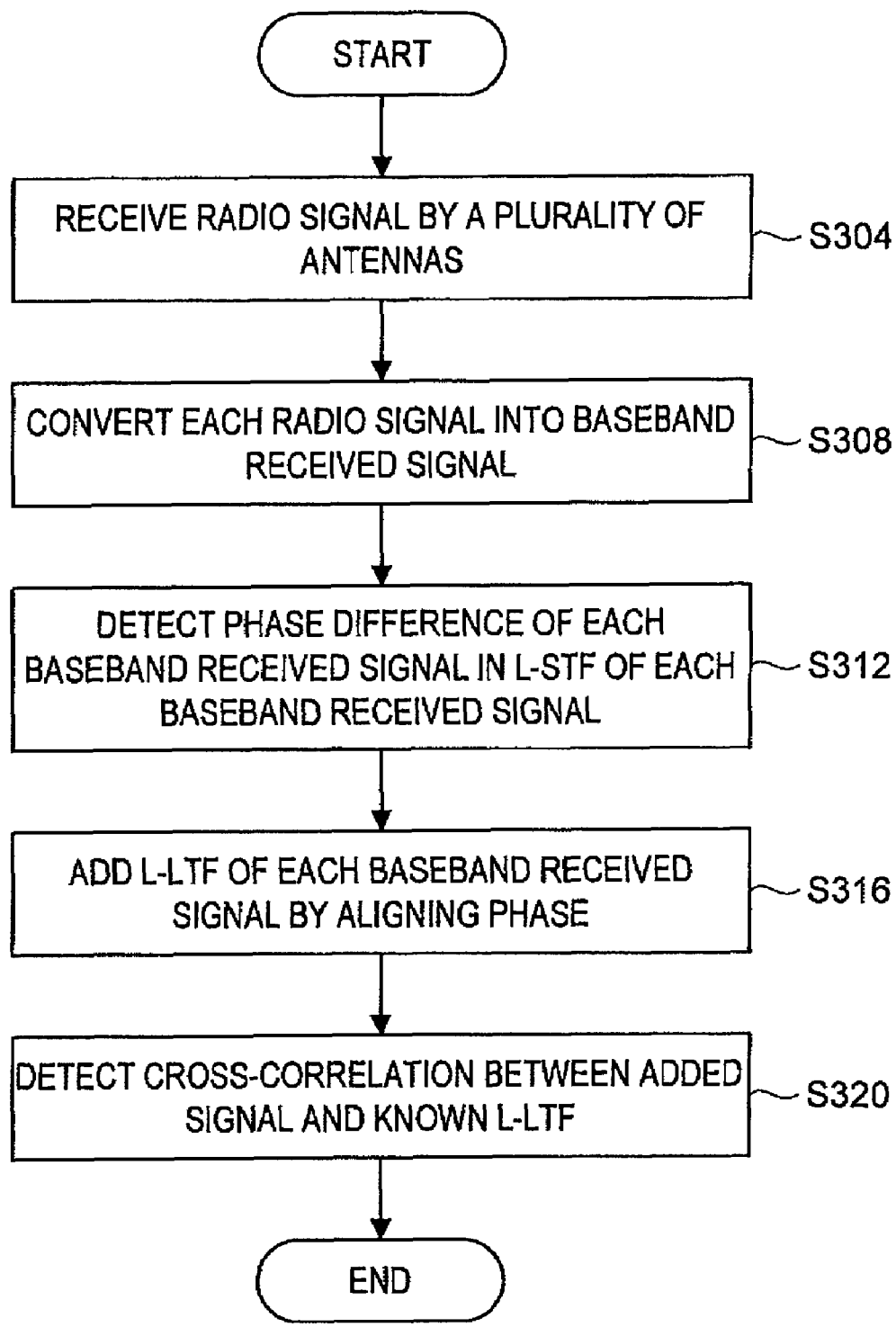
FIG. 7 is a flowchart showing the flow of a receiving method executed in the wireless communication apparatus according to the first embodiment of the present invention.

FIG. 7 is a flowchart showing the flow of a receiving method executed in the wireless communication apparatus 10 according to the first embodiment of the present invention. As shown in FIG. 7, the wireless communication apparatus 10 according to the embodiment first receives radio signals transmitted from the periphery by the plurality of antennas 12A and 12B (S304). Then, the RF reception processing units 60A and 60B and so on convert the radio signals received by the connected antenna 12A or 12B into baseband received signals (S308).

Then, the phase difference determination unit 124 of the synchronous circuit unit 70 determines the phase difference of the respective baseband received signals using the L-STF contained in the baseband received signals of the respective branches (S332). After that, the adding unit 130 of the synchronous circuit unit 70 adds up the L-LTF of the respective baseband received signals adjusted to be in-phase with each other (S316), and the peak detection unit 150 detects the cross-correlation between the added L-LTF and the L-LTF stored in the preamble table (S320).

(4) Second Embodiment of the Present Invention

As described in the foregoing, according to the first embodiment of the present invention, the L-LTF of a plurality of branches are added together, and the cross-correlation can be detected using the L-LTF obtained by the addition. Further, according to a second embodiment of the present invention, it is possible to estimate a frequency error using the L-LTF obtained by the addition. A synchronous circuit unit 71 of the wireless communication apparatus 10 according to the second embodiment of the present invention is described hereinafter with reference to FIG. 8.

Figure 8:
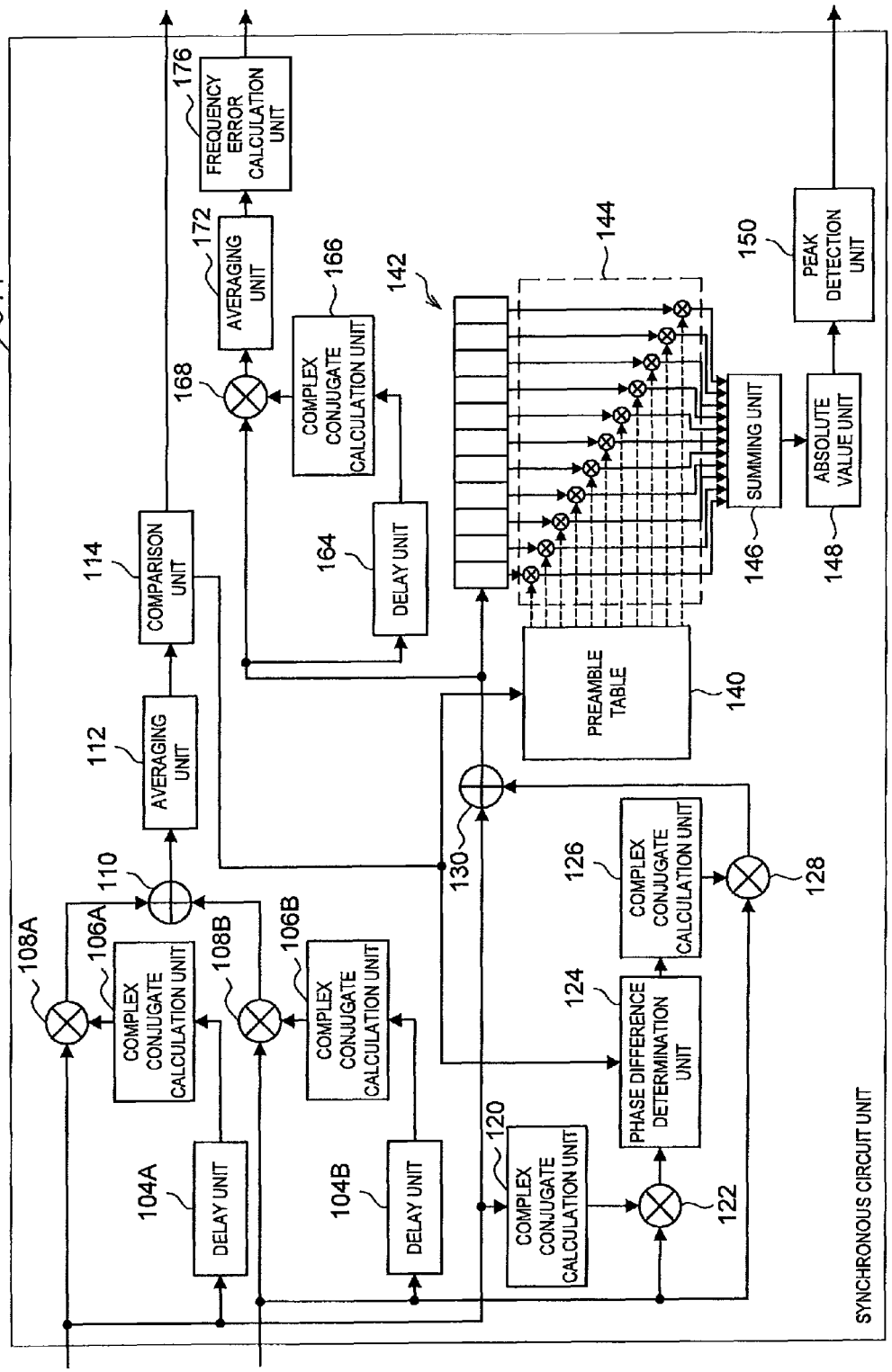
FIG. 8 is a functional block diagram showing the structure of a synchronous circuit unit according to a second embodiment of the present invention.

FIG. 8 is a functional block diagram showing the structure of the synchronous circuit unit 71 according to the second embodiment of the present invention. As shown in FIG. 8, the synchronous circuit unit 71 according to the second embodiment includes delay units 104A and 104B, complex conjugate calculation units 106A and 106B, multiplying units 108A and 108B, an adding unit 110, an averaging unit 112, a comparison unit 114, a complex conjugate calculation unit 120, a multiplying unit 122, a phase difference determination unit 124, a complex conjugate calculation unit 126, a multiplying unit 128, an adding unit 130, a preamble table 140, a shift register 142, a filter unit 144, a summing unit 146, an absolute value unit 148, a peak detection unit 150, a delay unit 164, a complex conjugate calculation unit 166, a multiplying unit 168, an averaging unit 172, and a frequency error calculation unit 176. The structure which is different from that of the first embodiment is mainly described hereinafter.

The adding unit 130 adds the L-LTF of the branch A and the L-LTF of the branch B which is adjusted to be in-phase with the L-LTF of the branch A by the complex conjugate calculation unit 126 and the multiplying unit 128. Then, the L-LTF added by the adding unit 130 is output to the shift register 142 for detecting cross-correlation and also to the delay unit 164 and the multiplying unit 168 for estimating a frequency error.

As described in the first embodiment, the structure from the shift register 142 to the peak detection unit 150 detects the cross-correlation and the synchronous timing based on the L-LTF (after addition) which is output from the adding unit 130. Further, in the second embodiment, the structure from the delay unit 164 to the frequency error calculation unit 176 can estimate a frequency error based on the L-LTF (after addition) which is output from the adding unit 130.

Specifically, the delay unit 164 delays the L-LTF which is output from the adding unit 130 by 3.2 μs and outputs it. The delay time 3.2 μs of the L-LTF by the delay unit 164 corresponds to the repetition period of the signal pattern in the L-LTF. The complex conjugate calculation unit 166 calculates the complex conjugate of the L-LTF delayed by the delay unit 164. The multiplying unit 168 multiplies the L-LTF which is output from the adding unit 130 and the L-LTF which is delayed by 3.2 μs and on which complex conjugate calculation is performed (detects the auto-correlation of the L-LTF). Then, the averaging unit 172 calculates the average of the multiplied value obtained by the multiplying unit 168, and the frequency error calculation unit 176 can estimate the frequency error based on the phase of the average value.

(5) Third Embodiment of the Present Invention

A synchronous circuit unit 71' of the wireless communication apparatus 10 according to a third embodiment of the present invention is described hereinafter with reference to FIG. 9.

Figure 9:
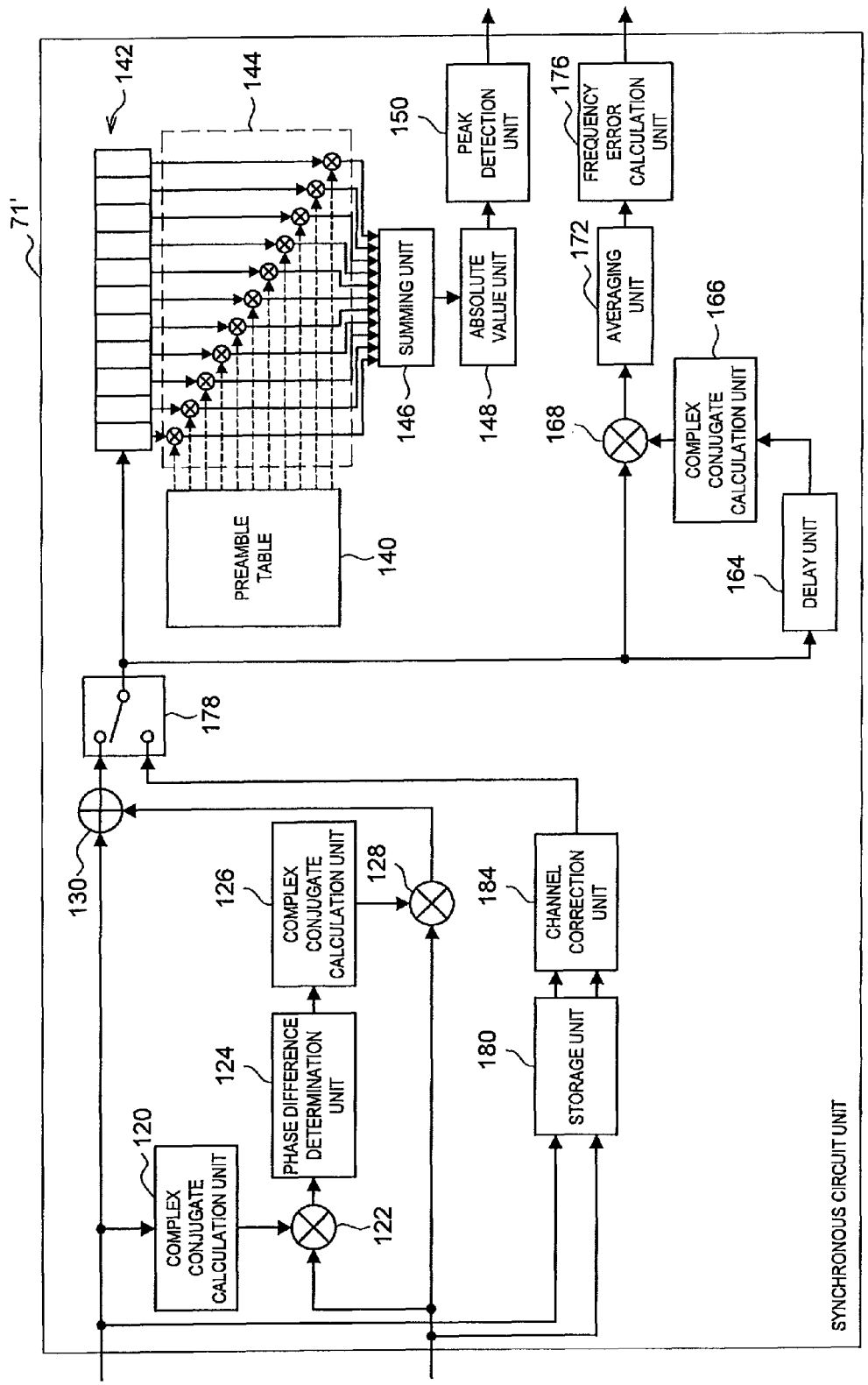
FIG. 9 is a functional block diagram showing the structure of a synchronous circuit unit according to a third embodiment of the present invention.

FIG. 9 is a functional block diagram showing the structure of the synchronous circuit unit 71' according to the third embodiment of the present invention. As shown in FIG. 9, the synchronous circuit unit 71' according to the third embodiment of the present invention includes a complex conjugate calculation unit 120, a multiplying unit 122, a phase difference determination unit 124, a complex conjugate calculation unit 126, a multiplying unit 128, an adding unit 130, a preamble table 140, a shift register 142, a filter unit 144, a summing unit 146, an absolute value unit 148, a peak detection unit 150, a delay unit 164, a complex conjugate calculation unit 166, a multiplying unit 168, an averaging unit 172, a frequency error calculation unit 176, a switch 178, a storage unit 180, and a channel correction unit 184. In FIG. 9, illustration of the structure for detecting the auto-correlation is omitted for clarification of the drawing.

As described in the first or second embodiment, when receiving the L-STF, the complex conjugate calculation unit 120, the multiplying unit 122 and the phase difference determination unit 124 determine the phase difference between the branches. Then, when receiving the L-LTF, the complex conjugate calculation unit 126, the multiplying unit 128 and the adding unit 130 align the phase of the L-LTF between the branches based on the determined phase difference and adds the respective L-LTF together. At this time, because the switch 178 is connected to the adding unit 130 in this embodiment, detection of the cross-correlation and the synchronous timing and estimation of the frequency error are performed based on the L-LTF added together by the adding unit 130.

Then, signal processing is performed on the L-LTF by the FFT units 72A and 72B and so on based on the synchronous timing detected by the peak detection unit 150 and the frequency error estimated by the frequency error calculation unit 176. Further, the channel estimation units 74A and 74B estimate the channel condition affecting each branch (the transfer function to the antenna 12A and the transfer function to the antenna 12B from the transmission source) based on the L-LTF on which signal processing is performed by the FFT units 72A and 72B and so on.

In parallel with the above processing, the L-LTF of each branch is stored in the storage unit 180 when receiving the L-LTF in this embodiment. The storage unit 180 may be a nonvolatile memory such as EEPROM (Electrically Erasable Programmable Read-Only Memory) or EPROM (Erasable Programmable Read-Only Memory), a magnetic disk such as a hard disk or a discoid magnetic disk, an optical disc such as CD-R (Compact Disc Recordable)/RW (ReWritable), DVD-R (Digital Versatile Disc Recordable)/RW/+R/+RW/RAM (Random Access Memory) or BD (Blu-ray Disc (registered trademark))-R/BD-RE, or a storage medium such as MO (Magneto Optical) disk or a register.

After the channel condition is estimated by the channel estimation units 74A and 74B, the channel correction unit 184 synthesizes the respective L-LTF stored in the storage unit 180 based on the estimated channel condition, and the switch 178 and the channel correction unit 184 are connected. As a result, the part from the shift register 142 to the peak detection unit 150 detects the synchronous timing again based on the L-LTF synthesized by the channel correction unit 184. Likewise, the part from the delay unit 164 to the frequency error calculation unit 176 estimates the frequency error again based on the L-LTF synthesized by the channel correction unit 184. Then, the synchronous timing and the frequency error obtained for the first time are replaced with the synchronous timing and the frequency error obtained for the second time.

Because the synchronous timing and the frequency error obtained for the second time are obtained based on the L-LTF which is corrected taking the channel condition into account, they are considered to be more accurate than the synchronous timing and the frequency error obtained for the first time. Thus, according to the third embodiment of the present invention, it is possible to further improve the accuracy of detection of the synchronous timing and estimation of the frequency error by temporarily storing the L-LTF in the storage unit 180.

(6) Summary

As described in the foregoing, according to the embodiment, it is possible to detect the cross-correlation and the synchronous timing by using the L-LTF of a plurality of branches in an adding manner. It is thereby possible to suppress degradation of the detection accuracy of cross-correlation while reducing the circuit scale for cross-correlation detection. Specifically, because timing detection can be performed taking the timing of all branches into account even when the reception timing of the L-LTF or the like is different between the branches, it is possible to prevent an increase in packet error due to the synchronous timing error. For example, this enables the synchronous timing of the signals of all branches to be within the guard interval period of each OFDM symbol in the OFDM scheme.

It should be understood by those skilled in the art that various modifications, combinations, sub-combinations and alterations may occur depending on design requirements and other factors insofar as they are within the scope of the appended claims or the equivalents thereof.

For example, although the example where the number of branches is two is described in the above embodiments, the number of branches is not limited thereto, and the number of branches of the wireless communication apparatus 10 may be large, i.e. three or more. If the number of branches of the wireless communication apparatus 10 is large, the wireless communication apparatus 10 may add the L-LTF of all branches or at least two branches together by aligning their phases and use the result for detection of the synchronous timing, estimation of the frequency error and so on.

Further, it is not necessary to perform each step in the processing of the wireless communication apparatus 10 in chronological order according to the sequence shown in the sequence chart or the flowchart. For example, and each step in the processing of the wireless communication apparatus 10 may include the processing which is performed in parallel or individually (e.g. parallel processing or object processing).

The present application contains subject matter related to that disclosed in Japanese Priority Patent Application JP filed in the Japan Patent Office on Jun. 9, 2008, the entire content of which is hereby incorporated by reference.

What is claimed is:

1. A receiving apparatus comprising:
a plurality of antennas;
a phase difference detection unit to detect a phase difference of each of a plurality of received signals received by the plurality of antennas;
a phase adjustment unit to align phase of the plurality of received signals based on the phase difference detected by the phase difference detection unit;
an adding unit to add the plurality of received signals with the phase aligned by the phase adjustment unit together;
a synchronous detection unit to perform synchronous detection using a signal obtained by addition in the adding unit; and
a frequency error estimation unit to estimate a frequency error of the plurality of received signals using the signal obtained by addition in the adding unit.

2. The receiving apparatus according to claim 1, wherein
the phase difference detection unit detects the phase difference by a first repetitive signal added to each of the plurality of received signals, and
the phase adjustment unit aligns the phase of a second repetitive signal added after the first repetitive signal.

3. The receiving apparatus according to claim 2 comprising:
a storage unit to store the second repetitive signal contained in each of the plurality of received signals received by the plurality of antennas;
a channel estimation unit to estimate a channel condition affecting each of the plurality of received signals based on a synchronous detection result by the synchronous detection unit; and
a correction unit to correct the second repetitive signal stored in the storage unit based on an estimation result of the channel condition by the channel estimation unit, wherein
the synchronous detection unit performs synchronous detection again using the second repetitive signal corrected by the correction unit.

4. A receiving method comprising the steps of:
receiving a radio signal transmitted from periphery as a received signal by each of a plurality of antennas;
detecting a phase difference of each of a plurality of received signals received by the plurality of antennas;
aligning phase of the plurality of received signals based on the phase difference;
adding the plurality of received signals with the phase aligned together; and performing synchronous detection using a signal obtained by the addition; and
estimating a frequency error of the plurality of received signals using the signal obtained by the addition.

5. A wireless communication system comprising:
a receiving apparatus including:
a plurality of antennas,
a phase difference detection unit to detect a phase difference of each of a plurality of received signals received by the plurality of antennas,
a phase adjustment unit to align phase of the plurality of received signals based on the phase difference detected by the phase difference detection unit,
an adding unit to add the plurality of received signals with the phase aligned by the phase adjustment unit together,
a synchronous detection unit to perform synchronous detection using a signal obtained by addition in the adding unit; and
a frequency error estimation unit to estimate a frequency error of the plurality of received signals using the signal obtained by addition in the adding unit; and
a transmitting apparatus being a transmission source of the plurality of received signals to be received by the plurality of antennas.

* * * * *